June 20, 1933.   F. S. BASTER ET AL   1,915,117
STRUCTURAL BRACING MEANS FOR VEHICLE CHASSIS FRAMES
Filed Feb. 2, 1931   2 Sheets-Sheet 1
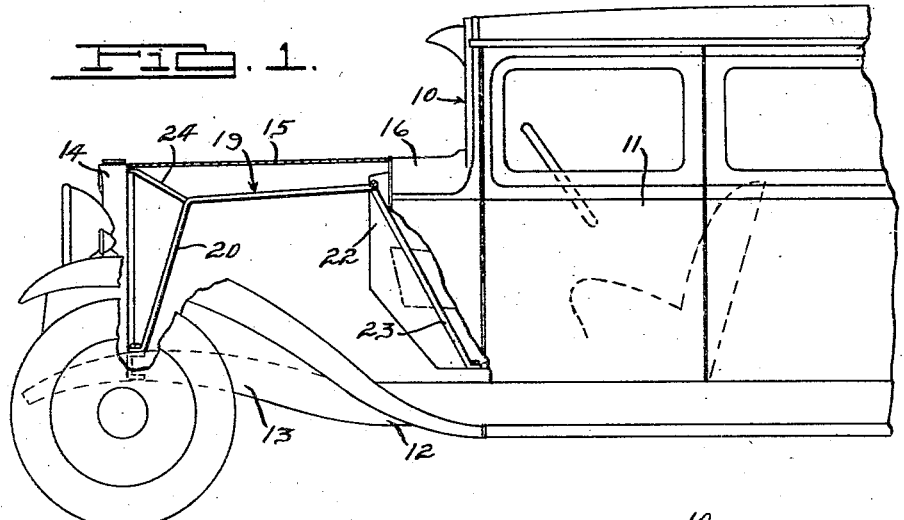
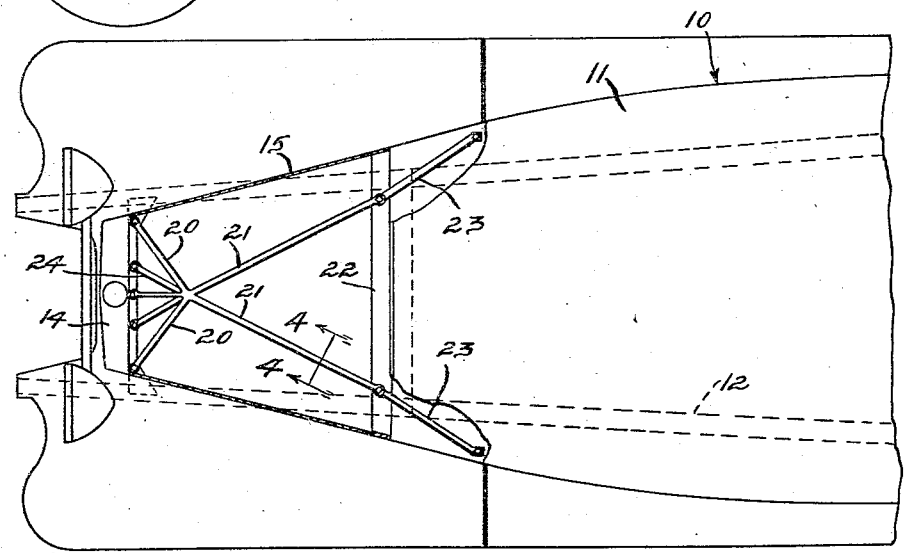
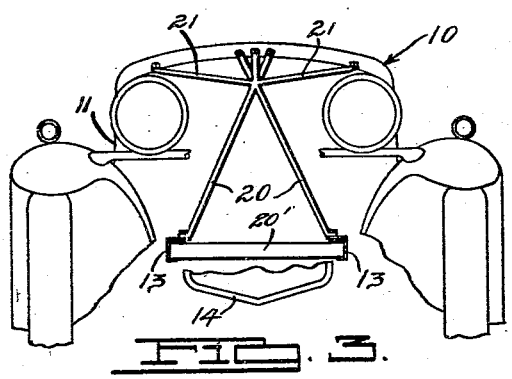
INVENTORS
Forest S. Baster,
Alfred E. Walden.
BY Whittemore Hulbert
Whittemore & Belknap
ATTORNEYS June 20, 1933.   F. S. BASTER ET AL   1,915,117
STRUCTURAL BRACING MEANS FOR VEHICLE CHASSIS FRAMES
Filed Feb. 2, 1931   2 Sheets-Sheet 2

INVENTORS
Forest S. Baster,
Alfred E. Walden,
BY Whittemore Hulbert
Whittemore & Belknap
ATTORNEYS.

Patented June 20, 1933

1,915,117

UNITED STATES PATENT OFFICE

FOREST S. BASTER AND ALFRED E. WALDEN, OF DETROIT, MICHIGAN, ASSIGNORS TO HUPP MOTOR CAR CORPORATION, OF DETROIT, MICHIGAN, A CORPORATION OF VIRGINIA

STRUCTURAL BRACING MEANS FOR VEHICLE CHASSIS FRAMES

Application filed February 2, 1931. Serial No. 513,008.

This invention relates generally to vehicles and refers more particularly to bracing means for stabilizing vehicle chassis constructions.

The invention contemplates stabilizing the front end portions of vehicle chassis frames without appreciably affecting the weight of the latter or the final cost of production of the same and to this end the invention consists in the provision of bracing means formed of tension and compression members arranged to resist angular or twisting movements of the front end portions of the frame relative to the remaining portions thereof supporting the vehicle body.

A further advantageous feature of this invention resides in the provision of bracing means of the type specified above, capable of being expediently assembled upon vehicles as now commercially produced without altering or otherwise interfering with the construction thereof.

With the foregoing as well as other objects in view, the invention resides in the peculiar construction of the bracing means and the manner in which the same is secured to the vehicle, which will be made more apparent as this description proceeds, especially when considered in connection with the accompanying drawings, wherein:

Figure 1 is a fragmentary side elevational view of a vehicle equipped with bracing means constructed in accordance with this invention;

Figure 2 is a fragmentary plan view of the construction shown in Figure 1;

Figure 3 is a front elevation view of the bracing means shown in Figure 2;

Figure 4 is a cross sectional view taken on the line 4—4 of Figure 2;

Figure 8:
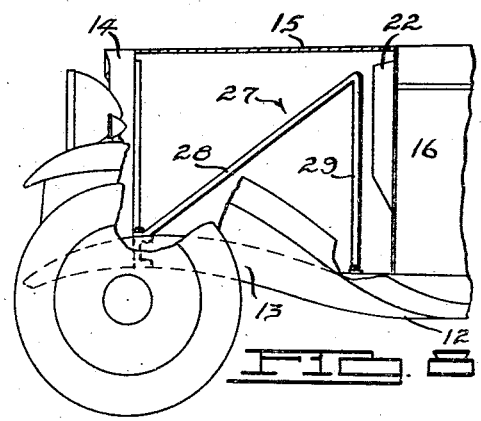
Figures 8, 9 and 10 are views similar to 1 to 3, inclusive, showing another modified form of construction.

Referring now to the drawings, it will be noted that there is illustrated in Figure 1 a portion of a vehicle 10 comprising a body 11 seated upon a chassis frame 12 formed of laterally spaced sills having the front end portions 13 thereof projecting forwardly beyond the body. In accordance with standard practice, the projecting end portions of the sills support a radiator 14, a motor (not shown) and various other parts of the vehicle. The motor is concealed or enclosed in the conventional manner by a removable hood 15 having the front end portions seated upon a portion of the radiator shell and having the rear ends supported on the cowl 16. As is usually the case, the construction of the body is such that the latter forms an inherent structural brace for the portions of the frame to which it is secured and due to this fact, functions to reinforce the latter portions of the frame. However, since the front ends of the frame project forwardly from the body an appreciable distance, there is a tendency for the front ends of the sills to have a scissors action or in other words, to move independent of each other in a substantially vertical plane relative to the body supporting portions of the frame aforesaid.

While several forms of bracing means are shown herein for resisting the aforesaid movements of the forward end portions of the sills, it is to be noted that these forms of the invention are for the purpose of illustration only and that we have not attempted to disclose all of the numerous modifications which may be employed for accomplishing the desired results. It will be apparent, however, as this description proceeds that each of the illustrated braces are formed of angularly arranged tension and compression members cooperating with each other and with portions of the frame and body to form triangles for resisting twisting or relative movement of the forward end portions of the sills in a substantially vertical plane. Moreover, the major portions of each of the braces shown herein form a unitary construction located beneath the hood 15 so as to be concealed from view and are detachably secured in place to facilitate removal when desired. In addition to the foregoing, the braces about to be described while effective for resisting twisting movements of the sills are relatively light in weight and inexpensive to manufacture with the result that the same may be installed upon motor vehicles without appreciably affecting the cost of manufacture or materially adding to the weight of the vehicle. The bracing means shown in Figures 1 to 3, inclusive, comprises tension and compression members substantially tubular in cross section and welded or otherwise suitably secured together to form a unitary structural brace 19 having a pair of bars 20 secured at the lower ends to the sills in rear of the radiator unit 14 and inclining upwardly and rearwardly from the points of securing. The bars 20 are also inclined toward each other and are united together at the upper ends thereof forming with the cross brace 20' of the chassis a transversely extending triangular brace as viewed in Figure 3. The upper ends of the bars are provided with rearwardly extending frame members 21 arranged as shown in Figure 2 to form a V-shaped brace having the apex thereof united to the apex of the triangular section formed by the bars 20 and having the opposite ends of the members 21 secured to the upper edge portions of the body dashboard 22 adjacent opposite sides thereof. The above construction is such that the V-shaped brace forms with the dash 22 a second triangle. To further strengthen the construction, the rear ends of the members 21 may also be connected to the sills by means of bars 23 extending rearwardly from the aforesaid ends of the bars 21 and disposed between the trimming material panel and outer body panel. As shown in Figure 1, the bars 23 incline downwardly and rearwardly from the rear ends of the bars 21 and are secured in any suitable manner to the sills at points spaced a substantial distance rearwardly of the dash. If desired, the forward ends of the bracing unit 19 may be connected to the upper ends of the radiator for supporting the latter by means of projections 24 extending forwardly from the upper ends of the bars 20 and flared outwardly therefrom as shown in Figure 2 for attachment to the radiator shell at spaced points. While, as hereinbefore stated, any suitable means may be employed for attaching the structural brace to the frame, body and radiator, it is to be noted that we preferably employ bolts and nuts for accomplishing this result so that the bracing means may be readily assembled with or removed from the vehicle as a unit. Referring briefly to the operation of the brace described above and assuming that the projecting portions of the sills have a tendency to move relative to each other in a substantially vertical plane, it will be noted that the triangle formed by the members 20 and cross brace 20' will have a tendency to move with the sills. However, since the apex of the latter triangle is formed integral with or connected to the apex of the triangle formed by the members 21 and dash structure 22, and since the free ends of the members 21 are connected to the sills in rear of the dash, it will be apparent that any movement of the members 20 will be resisted by the members 21 with the result that relative movement of the sills will also be resisted.

Figure 5:
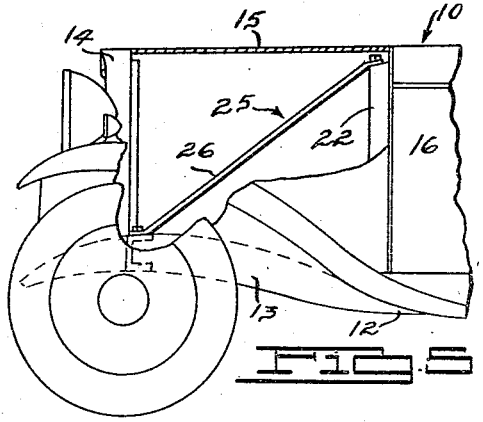
Figures 5, 6 and 7 are views similar to Figures 1, 2 and 3, showing a slightly modified form of bracing means.
Figure 6:
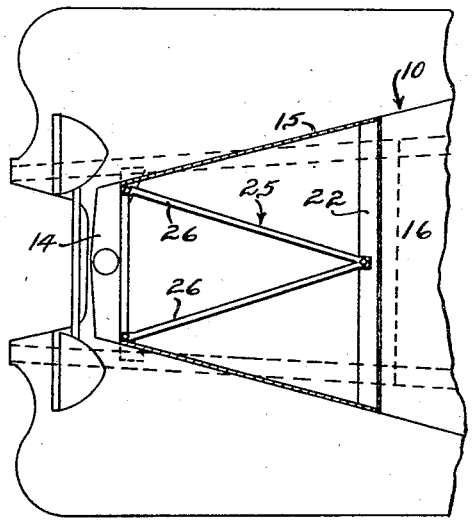
Figure 7:
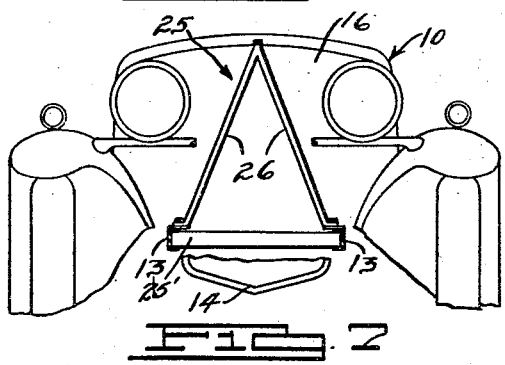

The bracing means illustrated in Figures 5, 6 and 7 also serves to brace the forward end portions of the sills from the body and comprises a substantially V-shaped member 25 having the apex thereof detachably secured to the upper end of the dash centrally of the latter and the lower ends of the legs 26 similarly secured to the sills in the rear of the radiator unit 14 forming with the cross member 25' a triangular brace. The legs 26 of the triangular-shaped brace form the tension and compression elements of the brace and as stated above, incline downwardly and forwardly from the apex of the triangle into engagement with the portions of the sills in rear of the radiator unit with the result that any twisting movement of the forward ends of the sills, is effectively resisted from the body.

Figure 9:
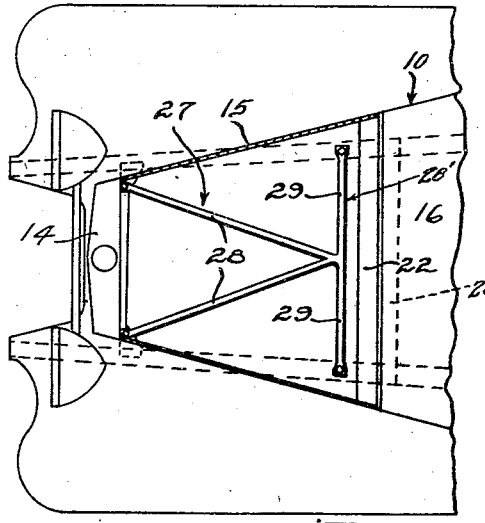
Figure 10:
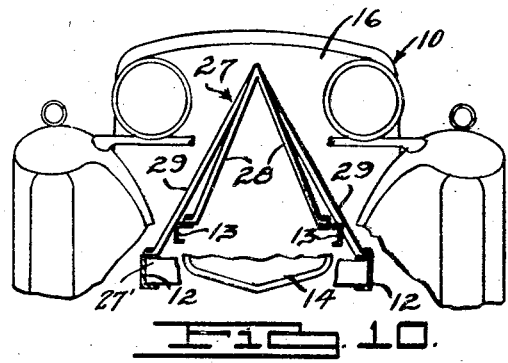

The modified form of the invention illustrated in Figures 8 to 10, inclusive, differs from the previously described constructions in that the bracing means functions independently of the body for stabilizing the front end portions of the sill members. As shown particularly in Figure 8, the bracing means 27 is of unitary construction and comprises a substantially V-shaped member 28 positioned with the apex spaced slightly forwardly of the dash adjacent the upper end thereof and having the leg portions thereof inclined forwardly and downwardly for attachment to the portions of the sills adjacent the radiator 14. The legs aforesaid form tension and compression elements and cooperate with the cross brace 27' of the chassis to form a transversely extending triangular section. The apex of the triangular section aforesaid is united to the apex of another V-shaped member 28' provided with opposite extending outwardly inclined leg portions 29 forming with the chassis cross brace 29' a second transversely extending triangular section and having the lower ends thereof rigidly secured to the sills adjacent the dash. With the foregoing construction, it will be apparent, especially upon viewing Figure 9, that the pair of legs 28 and the pair of legs 29 of the V-shaped sections not only cooperate with the chassis cross members 27' and 29', respectively, to form interconnected transversely extending triangular braces, but the legs 28 also cooperate with the adjacent legs 29 to form with portions of the side sills longitudinally extending triangular braces on opposite sides of the longitudinal median line of the chassis. The arrangement is such that twisting or relative movements of the projecting portions of the sills in a substantially vertical plane is effectively resisted by the tension and compression by portions 28 and 29 of the aforesaid triangular sections and is especially desirous where the construction of the body is such as to prohibit utilizing the same as a structural member of the brace.

What we claim as our invention is:

1. A vehicle having in combination, a body, a frame for the body having laterally spaced sills projecting forwardly beyond the body, and a brace for the forwardly projecting portions of the sills formed of a plurality of angularly arranged members cooperating with each other and with the forwardly projecting portions of both sills as well as with portions of the body to form a plurality of triangles having portions secured to the sills for resisting relative movement of the forward end portions thereof.

2. A vehicle having in combination, a body, a frame for the body having laterally spaced sills projecting forwardly from the body, and means for stabilizing the forwardly projecting portions of the sills including a brace formed of a plurality of angularly arranged tension and compression members extending upwardly and rearwardly from the forward end portions of both the sills and cooperating with each other and portions of the frame to form a plurality of triangles for resisting relative movement of the projecting portions of the sills.

3. A vehicle having in combination, a body, laterally spaced sill members projecting forwardly from the body, means for bracing the sill members including a plurality of angularly arranged braces cooperating with each other and with portions of both the sills and body to form a plurality of triangles.

4. A vehicle having in combination, a frame, a body secured to the rear portions of the frame, a removable structural brace for stabilizing the front end portions of the frame including a pair of members extending upwardly and rearwardly from opposite sides of the frame and joined together at the upper ends to form with portions of the frame a triangle and a second pair of members extending outwardly and rearwardly from the apex of the triangle aforesaid with the rear ends thereof secured to a part of the body to form therewith a second triangle.

5. A vehicle having in combination, a frame having laterally spaced sills, a body secured to the rear portions of the sills, a structural brace secured to the forward end portions of both sills and comprising angularly arranged members cooperating with each other and portions of the frame to form a triangle, and means for removably securing the brace to the frame.

6. A vehicle having in combination, a frame having laterally spaced sills, a body fastened to the rear portions of the sills, bracing means for the forward end portions of the sills resisting relative movement of the latter in a substantially vertical plane, said bracing means comprising a structural brace formed of angularly arranged tension and compression members cooperating with each other and with portions of both the sills as well as with portions of the body to form a series of triangles, and means for removably securing the brace in place permitting the same to be readily attached to or removed from the vehicle.

7. A vehicle having in combination, a frame having laterally spaced sills, means for stabilizing the front end portions of the sills including, a brace having a V-shaped portion with the apex thereof located above the sills intermediate the latter and the legs thereof secured to opposite sides of the frame, said brace having a second V-shaped portion disposed in a plane transverse to the plane of the V-shaped portion aforesaid and having the apex thereof connected to the apex of the first-named V-shaped portion, and means connecting the rear ends of the second V-shaped section to the sills.

8. A vehicle having in combination, a body, a frame for the body and having portions projecting forwardly from the body, means for stabilizing the projecting portions of the frame including a structural brace having a V-shaped portion arranged with the apex above the frame intermediate opposite sides thereof and having the leg portions thereof secured to opposite sides of the frame, said brace having a second V-shaped portion having the apex thereof connected to the apex of the V-shaped portion aforesaid and having the legs thereof extending rearwardly from the apexes aforesaid, and means for connecting the rear ends of the legs to the body.

9. A vehicle having in combination, a body, a motor compartment in advance of the body, a chassis frame formed of laterally spaced sill members extending the full length of the motor compartment and body and secured to the latter, and a unitary structural brace located within the motor compartment above the sill members and secured to both the latter, said bracing means comprising angularly arranged members cooperating with each other and portions of the body to resist relative movements of the forward portions of sills in a substantially vertical plane.

10. A vehicle having in combination, a body, laterally spaced sill members projecting forwardly from the body, means for bracing the projecting portions of the sills from the body including structural members inclining upwardly and rearwardly from the forward ends of both the sills, and means for attaching the forward ends of the structural members to both the sills adjacent the forward ends thereof and for attaching the rear ends of the members to a part of the body.

11. A vehicle having in combination, a frame formed of laterally spaced sills, a body assembly supported upon the rear portions of the sills, a radiator unit spaced forwardly from the body and connected to the sills, a hood enclosing the space between the body and radiator unit, and a unitary structural brace located beneath the hood and connecting the forward end portions of both the sills with the body for resisting relative movements of the latter ends of the sills in a substantially vertical plane.

12. A vehicle having in combination, a frame formed of laterally spaced sills, a body assembly supported upon the rear portions of the sills, a radiator unit spaced forwardly from the body and connected to the sills, a hood enclosing the space between the body and radiator unit, and a structural brace located beneath the hood and formed of angularly arranged tension and compression members having portions secured to the sills intermediate the body and radiator for stabilizing the sills.

13. A vehicle having in combination, a body provided with a transverse frame member at the front end thereof, laterally spaced sill members projecting forwardly from the frame member, means for bracing the sills from the body including structural members having the forward ends secured to the sills adjacent the front ends thereof and inclining upwardly and rearwardly from the latter ends of the sills for attachment to the upper end portion of the frame member aforesaid, and a pair of braces having the upper ends secured to the latter member and inclining downwardly and rearwardly from the same for attachment to the sills at points spaced rearwardly therefrom.

14. A vehicle having in combination, a body provided with a transverse frame member at the front end thereof, laterally spaced sill members projecting forwardly from the frame member, means for bracing the sills from the body including structural members having the forward ends secured to the sills adjacent the front ends thereof and inclining upwardly and rearwardly from the latter ends of the sills for attachment to the upper end portion of the frame member adjacent opposite sides thereof, and a pair of braces having the upper ends secured to the rear ends of the structural members aforesaid by the same securing means serving to attach the latter members to the frame member and having the lower ends secured to the sills at points spaced a substantial distance rearwardly from the said frame member.

15. A vehicle having in combination, a body provided with a transverse frame member at the front end thereof, laterally spaced sills projecting forwardly from the frame member, means for bracing the sills from the body including structural members having the forward ends secured to the sills adjacent the front ends thereof and inclining upwardly and rearwardly from the latter ends of the sills for attachment to the upper end portion of the frame member, and a pair of braces having the upper ends secured to the dash and inclining downwardly and rearwardly from the latter between the inner and outer panels of the body for attachment to the sills at points spaced rearwardly from the transverse frame member.

16. A vehicle having a chassis frame provided with laterally spaced side sills, means for bracing the forward end portions of the frame including a substantially V-shaped brace extending transversely of the frame with the apex spaced above the sills substantially midway between the latter and having the leg portions anchored to the sills, and means connected to the apex of the brace for stabilizing the latter.

17. A vehicle having a chassis frame provided with laterally spaced side sills and transversely extending cross members connected to the side sills, means for bracing the forward end portions of the frame including a substantially V-shaped member extending transversely of the frame with the apex thereof spaced above the sills intermediate the latter and cooperating with one of said cross members to form a triangular brace, and means connected to the apex of said triangular brace for stabilizing the action of the latter.

18. A vehicle having a chassis frame provided with laterally spaced side sills, means for bracing the forward end portions of the frame including a substantially V-shaped brace extending transversely of the frame with the apex spaced above the sills substantially midway between the latter and having the leg portions anchored to the sills, and means for stabilizing the action of the brace including a second substantially V-shaped brace arranged in a plane transverse to the plane of the brace aforesaid and having the apex thereof connected to the apex of said first-named brace.

19. A vehicle having a chassis frame provided with laterally spaced sills, means for bracing the forward end portions of the frame including a substantially V-shaped brace having the apex thereof spaced above the frame and having the leg portions anchored to the frame, and means for stabilizing the action of the brace including a second substantially V-shaped brace arranged in a plane transverse to the plane of the brace aforesaid and having the apex thereof connected to the apex of said first-named brace.

20. A vehicle having a chassis frame provided with laterally spaced sills, means for bracing the forward end portions of the frame including a substantially V-shaped brace having the apex thereof spaced above the frame and having the leg portions anchored to one of the sills at longitudinally spaced points, and a second substantially V-shaped brace having the apex thereof rigidly secured to the apex of the brace aforesaid and having the leg portions anchored to the other sill of the frame.

21. A vehicle having in combination, a body, laterally spaced sill members having portions projecting forwardly beyond the body, and means for stabilizing the forwardly extending portions of the sill members including a brace secured to both the latter members and comprising angularly arranged structural elements extending upwardly from the portions aforesaid of both the sills and forming with each other and with portions of the body a rigid sustaining unit.

22. A vehicle having in combination, a body, a chassis frame for the body having laterally spaced sills projecting forwardly beyond the body, and means interconnecting the portions aforesaid of the sills to stabilize the same including a rigid structural brace formed of a plurality of angularly arranged tension or compression members extending upwardly from both the sills and cooperating with each other and portions of the chassis frame to resist relative movement of the forwardly projecting portions of the sills.

23. A vehicle having in combination, a body provided with a transverse structural member at the front end thereof, laterally spaced sills having portions projecting forwardly beyond the front end of the body, means interconnecting the forwardly projecting portions of the sills for stabilizing the same including tension or compression members extending upwardly from the sills to a common apex, and means interconnecting the upper ends of said members to the transverse structural member aforesaid of the body.

24. A vehicle having in combination, a body, laterally spaced sill members having portions projecting forwardly beyond the front end of the body, and means interconnecting the laterally spaced sill members for stabilizing the latter including tension or compression members extending upwardly from the portions aforesaid of both sills to a common apex.

25. A vehicle having in combination, a body, a motor compartment, laterally spaced sills projecting forwardly from the body beneath the motor compartment, and structural bracing means concealed in said motor compartment and comprising angularly arranged tension and compression members connected together at the upper ends thereof and secured at the lower ends to both the sills aforesaid for resisting relative movement of the sills in substantially vertical planes.

26. A vehicle having in combination, a body, a motor compartment in advance of the body, a chassis frame having laterally spaced sills extending beneath the body and motor compartment, and a structural bracing element located in the motor compartment and formed of tension and compression members secured at the lower ends to the portions of both sills projecting beyond the body and forming with the frame a series of triangles for resisting relative movements of the sills.

In testimony whereof we affix our signatures.

FOREST S. BASTER.
ALFRED E. WALDEN.